United States Patent
Blubaugh (10) Patent No.: US 8,826,451 B2
(45) Date of Patent: Sep. 2, 2014

(54) MECHANISM FOR FACILITATING COMMUNICATION AUTHENTICATION BETWEEN CLOUD APPLICATIONS AND ON-PREMISE APPLICATIONS

(75) Inventor: Michael David Blubaugh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 475 days.

(21) Appl. No.: 12/973,738

(22) Filed: Dec. 20, 2010

(65) Prior Publication Data

US 2012/0042216 A1 Feb. 16, 2012

Related U.S. Application Data

(60) Provisional application No. 61/374,074, filed on Aug. 16, 2010.

(51) Int. Cl.
H04L 29/00 (2006.01)

(52) U.S. Cl.
USPC .............. 726/27; 713/153; 713/154; 726/5; 726/10; 726/11; 726/12; 726/13

(58) Field of Classification Search
USPC ........... 713/153, 154; 726/4, 5, 10, 11, 12, 13
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,115,472 A * | 9/2000 | Shimizu et al. | 380/262 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |

(Continued)

Primary Examiner — Brandon Hoffman
Assistant Examiner — Michael D Anderson
(74) Attorney, Agent, or Firm — Blakely, Sokoloff, Taylor & Zafman LLP (57) ABSTRACT

In accordance with embodiments, there are provided methods and systems for providing communication authentication between cloud applications and on-premise applications. A method of embodiments includes receiving, from a cloud application at a cloud computing device, a first message at an application server of a server computing system, and parsing, at the application server, the first message to determine first identification information contained within the first message. The method further includes authenticating, at the application server, the first message by verifying the first identification information, and forwarding the first authenticated message to an on-premise application at a remote computing device.

18 Claims, 6 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,510,464 B1 * | 1/2003 | Grantges et al. ............. 709/225 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,711,847 B2 * | 5/2010 | Dhupelia et al. ............. 709/239 |
| 7,890,755 B2 * | 2/2011 | Schnackenberg et al. .... 713/166 |
| 7,891,001 B1 * | 2/2011 | Greenawalt et al. ............. 726/22 |
| 8,185,944 B2 * | 5/2012 | Schnackenberg et al. ...... 726/12 |
| 8,347,355 B2 * | 1/2013 | Mower et al. ..................... 726/3 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0123226 A1 * | 6/2006 | Kumar et al. .................. 713/154 |
| 2011/0184993 A1 * | 7/2011 | Chawla et al. ................ 707/802 |
| 2011/0264910 A1 * | 10/2011 | Masuda ........................ 713/155 |
| 2012/0069131 A1 * | 3/2012 | Abelow ..................... 348/14.01 |
| 2013/0042106 A1 * | 2/2013 | Persaud et al. ................ 713/165 |

* cited by examiner

MECHANISM FOR FACILITATING COMMUNICATION AUTHENTICATION BETWEEN CLOUD APPLICATIONS AND ON-PREMISE APPLICATIONS

CLAIM OF PRIORITY

This application claims the benefit of U.S. Provisional Patent Application No. 61/374,074, entitled "Cloud to On-Premise Messaging Authentication" by Mike Blubaugh, filed Aug. 16, 2010, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to message authentication and, more specifically, relate for a mechanism for facilitating communication authentication between cloud applications and on-premise applications in a database network system computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The conventional communication authentication between cloud application and on-premise applications is largely poll-based, i.e., an on-premise application polls a cloud application for an update and, in response, the queried cloud application provides the necessary information to the inquiring on-premise application. In other words, it is the on-premise application that has to detect a change and inquire from the appropriate cloud applications. Certain conventional security techniques, such as various encryption techniques, firewalls, etc., may be employed to provide security in communication of messages, but they do not serve to authenticate the message. Furthermore, these conventional security techniques, nevertheless, maintain burden on on-premise applications to anticipate and/or detect updates or changes and request the relevant cloud applications for such updates and changes.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Unfortunately, conventional database approaches might be accessible to unauthorized persons if, for example, unauthorized person are able to get through or around the conventional security techniques.

SUMMARY

In accordance with embodiments, there are provided methods and systems for providing communication authentication between cloud applications and on-premise applications. A method of embodiments includes receiving, from a cloud application at a cloud computing device, a first message at an application server of a server computing system, and parsing, at the application server, the first message to determine first identification information contained within the first message. The method further includes authenticating, at the application server, the first message by verifying the first identification information, and forwarding the first authenticated message to an on-premise application at a remote computing device.

While one or more implementations are described with reference to an embodiment in which techniques for providing communication authentication between cloud applications and on-premise applications are implemented in a system having an application server providing a front end for an on-demand database service capable of supporting multiple tenants, the one or more implementations are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. One or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Methods and systems are provided for facilitating authenticated communication between cloud applications and on-premise applications.

Embodiments provide for an authentication mechanism for facilitating authenticated communication between cloud applications and on-premise applications without having to put the communication initiation burden on the on-premise application. Examples of cloud applications include any number and/or type of salesforce.com™ applications or third-party applications, such as workday®, etc. Similarly, on-premise applications may include any number and/or type of software applications running on remote (client) machines or computing systems. Although the on-premise applications can run on any number of remote machines, they may, however, be hosted by an application server (e.g., JAVA® 2 Enterprise Edition (J2EE) engine, Advanced Business Application Programming (ABAP) engine, IBM® WebSphere® Application Server, etc.) on the same machine or a separate machine server machine. Continuing with the employment-based applications theme, examples of on-premise applications include employee onboarding, employee update, etc. Examples of bi-directional communication between cloud applications and on-premise applications include outbound messages (e.g., addition of a new employee, update to employee details, completion of a manual task, etc.) from one or more cloud applications to one or more on-premise applications, and inbound messages (e.g., notification or confirmation of successful reception of an outbound message, a request for information, etc.) that are communicated vice versa.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing authenticated communication between cloud applications and on-premise applications will be described with reference to example embodiments.

Figure 1:
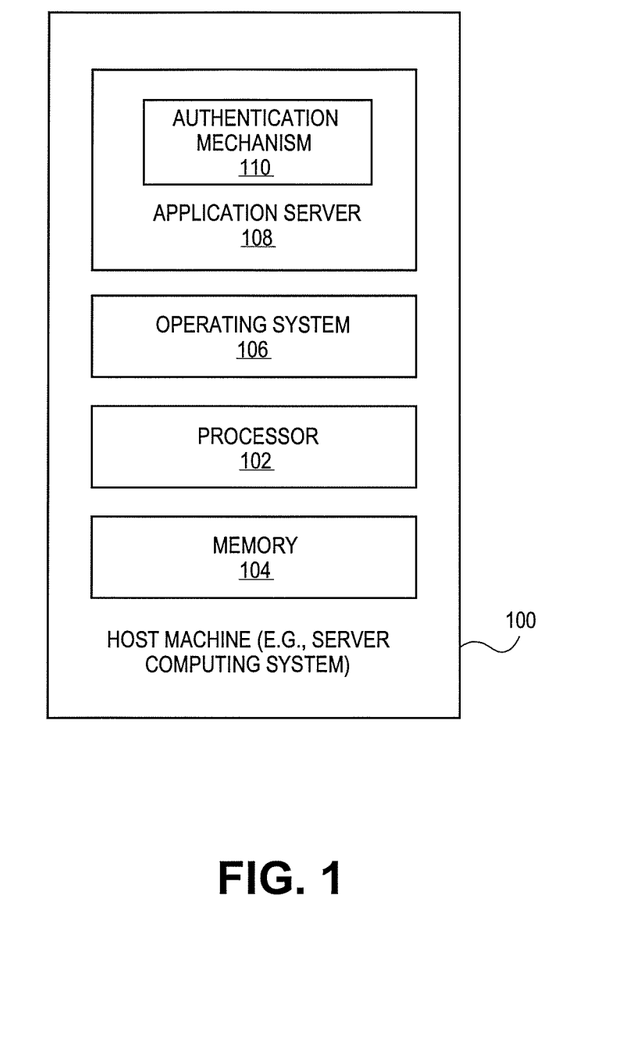
FIG. 1 illustrates a host machine employing authentication mechanism according to one embodiment.

FIG. 1 illustrates a host machine 100 employing authentication mechanism 110 according to one embodiment. Host machine 100 comprises a computing platform, which may be capable, for example, of working with a standard operating system 106. Operating system 106 serves as an interface between any hardware or physical resources of the host machine 100 and a user. In some embodiments, base hardware platform may include a processor 102, memory devices 104, network devices, drivers, and so on. Host machine 100 may include a server computing system or a client computing system and further, terms like "machine", "device", "computer", "computing device", and "computing system" are used interchangeably and synonymously throughout this document.

In one embodiment, application server 100 (e.g., J2EE application server) employs the authentication mechanism 110 to facilitate and manage authentication of communication between cloud applications and on-premise applications without having to put the burden on on-premise applications to anticipate and/or detect any updates or changes on the cloud-side of applications and initiate contact with one or more relevant cloud applications to obtain messages about such updates or changes. Authentication mechanism 110 and its operations are further discussed in the subsequent figures. As aforementioned, the application server 108 includes a J2EE engine, ABAP engine, and the like. An application server 110 refers to or includes a software framework dedicated to efficient execution of procedures (e.g., programs, routines, scripts) for supporting the construction of software applications.

Cloud applications are part of cloud computing, which refers to Internet-based computing such that shared resources, software, and information can be provided, on demand, to various computing systems and devices (that are inside or outside of cloud computing). Cloud architecture that is used in the delivery of cloud computing can involve multiple computing systems and cloud components communicating with each other over application programming interfaces, such as web services. On-premise applications refer to software applications that are typically house at client computing systems and are used and accessed by end-users (e.g., customers). For example, an on-premise application may include an employment or customer relations application that is at a client's location (e.g., on computers of a company or organization having license to use the on-premise application) and is used and managed by company employees.

Figure 2:
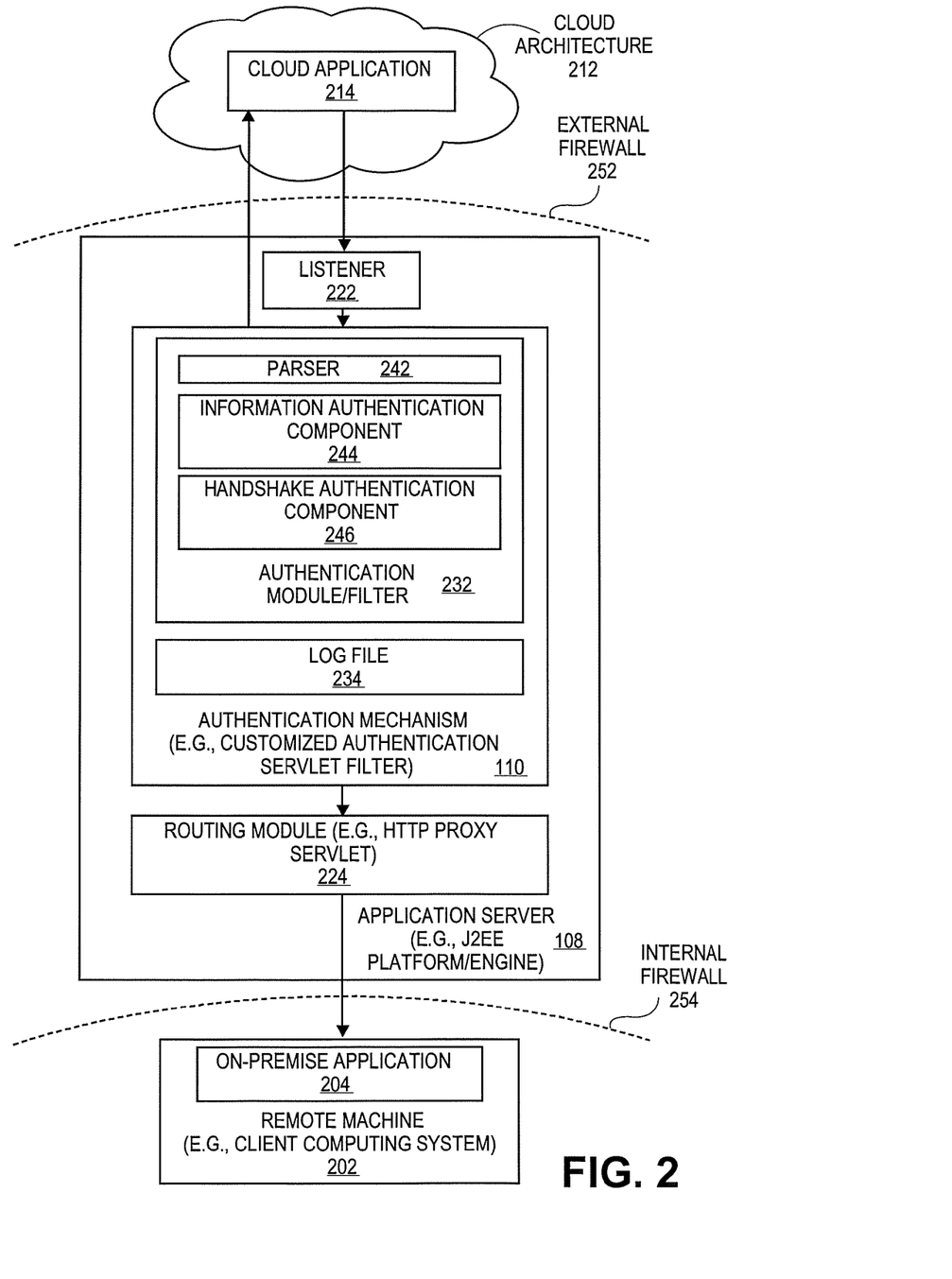
FIG. 2 illustrates authentication mechanism according to one embodiment.

FIG. 2 illustrates authentication mechanism 110 according to one embodiment. In one embodiment, the authentication mechanism 110 is housed at an application server 110 further having a listener 222 and a routing (or forwarding) module 224. The listener 222 may include a typical application server listener to listen to messages received from a cloud application 214 provided by a cloud computing architecture 212. As previously discussed, embodiments may apply to bi-directional communication between the cloud and on-premise applications 214, 204; however, in the illustrated document and elsewhere in this document, merely outbound messages (that are initiated at the cloud application 214 and received at the on-premise application 204) are discussed for brevity, clarity, and ease of understanding.

The routing module 224 includes a forwarding mechanism that can forward or pass on any messages from the application server 108 to the on-premise application 204 hosted at a remote (client) computing system 202. Although merely one computing system 202 is illustrated for brevity, it is contemplated that any number of remote computing systems hosting multiple on-premise applications may be involved and in communication with any number of cloud applications provided by several cloud architectures. An example of the routing module 224 includes a Hypertext Transfer Protocol (HTTP) proxy servlet that is a Java™ servlet used in an external web servlet container, such as WebSphere Application Server or Apache Tomcat to receive HTTP requests from web services client applications, etc. Further, the HTTP proxy servlet supports Secure Socket Layer (SSL) secure protocol. Outbound messages may be encrypted in accordance with the SSL (or Transport Layer Security (TLS)) cryptographic protocols to provide communication security over the Internet.

For additional security, the application server 108 may serve as a demilitarized zone (DMZ) server that is a physical or logical sub-network containing and exposing an organization's external services to a larger untrusted network, usually the Internet. In the illustrated embodiment, the application server 108 is separated from the cloud architecture 212 and the remote machine 202 using an external firewall 252 and an internal firewall 254, respectively. A firewall (e.g., hardware, software, or a combination of both) may be part of a computer system or network that is designed and used to inspect messages passing through it and block unauthorized access while permitting authorized communications based on a set of criteria. For example, firewall may include a device or a set of devices configured to permit or deny network transmissions to prevent unauthorized public network (e.g., Internet) users from accessing private networks (e.g., intranets). In the illustrated embodiment, the external firewall 252 may be configured to allow only messages from the Internal Protocol (IP) addresses of the known sources of outbound messages, such as specific cloud applications 214 from which messages are expected.

In one embodiment, the cloud application 214 (e.g., salesforce.com, Workday, etc.) issues a message (e.g., an outbound message about an update to an employee record, such as addition or termination of an employee, update to employee details, completion of a manual task, etc.) for the on-premise application 204 (e.g., Employee Onboarding, Employee Update, etc.) to receive and use. The issued message passes the external firewall 252 and reaches the listener 222. The external firewall may be configured to identify the IP addresses of the cloud application 214 (which is the source of message) and the host machine hosting the application server 108. Once the message is received at the listener 222, it is listened to and then communicated on to the authentication mechanism 110 (e.g., customized authentication servlet filter) for further processing. The authentication mechanism 110 includes an authentication module or filter 232 having an information authentication component (information component) 244, a handshake authentication component (handshake component) 246, and a parser 242.

In one embodiment, the message may contain certain confidential and/or identifying predetermined information, such as username, password, or some sort of flag or mark, etc., that is recognized by the information component 244 to authenticate the message. The information component 244 may be previously configured to recognize such identifying information. Once the message is received at the authentication filter 232, it is then parsed by the parser 242 to determine whether the message contains any confidential and/or identifying information (e.g., username/password, a secret identifying term, a flag, a mark, etc.). If the parsed message contains any identifying information, it is passed on to the information component 244 for information authentication, while if the parsed message does not reveal any identifying information, it is the passed on to the handshake component 246 for handshake authentication. If the message is received by the information component 244, it then reads, identifies, and authenticates the identifying information. If the message passes information authentication, it is sent to the on-premise application 204 via the routing module 224. If the message fails information authentication, an error message is issued and logged into a log file 234, while an error notification may be communicated back to the cloud application 212.

If a message fails the information authentication process or a new message (without any identifying information or with some identifying information but needing additional authentication) is received from the cloud application 214 at the listener 222, the handshake component 246 may be triggered to perform handshake authentication of the message. In one embodiment, the handshake component 246 receives the message and performs handshake (or callback) authentication of the message by re-contacting or calling back the cloud application 214 to verify whether the cloud application 214 is the one to transmit the message and that the message is authentic. Upon calling back the cloud application 214, if the cloud application 214 (or a cloud machine hosting the cloud application 214) verifies itself and confirms that the message to be valid (in other words, a handshake between the cloud application 214 and the handshake component 246 is performed), the handshake component 246 authenticates the message and forwards it to the routing module 224 to be passed on to the on-premise application 204. If the message fails handshake authentication (e.g., the cloud application 214 fails to verify itself or the message it had transmitted), an error is registered in the log file 234 and a notification is sent back to the cloud application 214.

If the message passes information authentication and/or handshake authentication, the message is transmitted to the routing module 224 (e.g., HTTP proxy servlet) to properly forward the authenticated message to the appropriate on-premise application 204 at the remote machine 202. As the message is forwarded on to the on-premise application 204, it passes through the internal wall 254 which may be configured to know and verify the IP addresses of the destination machine (e.g., remote machine 202) and the host machine hosting the application server 108. The on-premise application 204 receives the message. In some cases, the on-premise application 204 may send back a message-reception notification message to the cloud application 214.

Furthermore, an SSL or another encryption standard may be employed by the machines (e.g., a cloud machine in the cloud architecture 212 hosting the cloud application 214, the host machine hosting the application server 108, and the remote machine 202 hosting the on-premise application 204) to verify the encryption message is coming from a known source and so it can be properly decrypted. In one embodiment, the log file 234 can be accessed by and/or provided to a user (e.g., software developer, computer programmer, system administrator, etc.). For example, the log file 234 having a list of errors may be displayed, using a Graphical User Interface (GUI)-based application, on a display device for the user to view and use, such as for troubleshooting.

Figure 3:
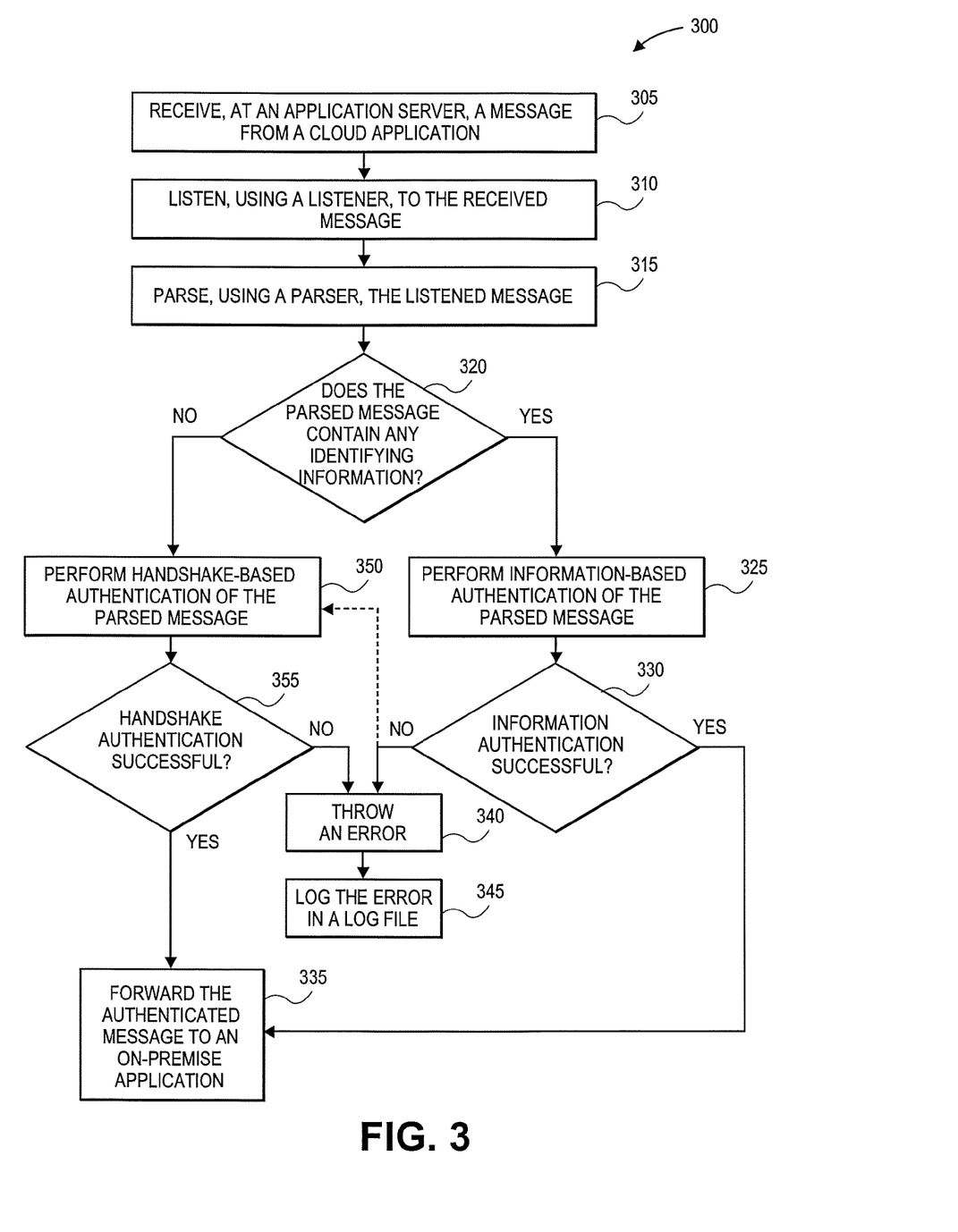
FIG. 3 illustrates a method for conducting communication authentication according to one embodiment.

FIG. 3 illustrates a method for conducting communication authentication according to one embodiment. Method 300 may be performed by hardware, software or a combination thereof. In one embodiment, method 300 may be performed by authentication mechanism of FIG. 1. At block 305, a message is received, from a cloud application, at a listener of an application server. At block 310, the listener listens to the message and forwards it to authentication mechanism hosted by the application server. At block 315, in one embodiment, a parser of an authentication module or filter of the authentication mechanism receives and parses the message to determine whether the message contains any confidential and/or identifying information. At block 320, a determination is made as to whether the message contains any confidential and/or identifying information. If it does, the parsed message is passed on an information authentication component of the authentication filter for information authentication at block 325. In one embodiment, the information component reads and verifies the confidential and/or identifying information contained within the message for authentication of the message. At block 330, a determination is made as to whether the confidential and/or identifying information is verified and the message is authenticated. If the message is authenticated, it is forwarded, via a routing module at the application server, to one or more on-premise applications hosted at one or more remote computing systems at block 335. If the message fails information authentication, an error is thrown, at block 340, and recorded in a log file at block 345 or, in one embodiment, another authentication attempt is made at authenticating the failed message by subjecting it to handshake authentication at block 350. Also, referring back to block 320, if the parsed message does not reveal any confidential and/or identifying information to satisfy information authentication, it is then forward to a handshake authentication component of the authentication filter to perform handshake authentication of the message at block 350.

At block 350, handshake authentication of the message is performed by calling back the cloud application that was responsible for sending the message to verify itself and/or the message. If the cloud application verifies itself and/or the message, a handshake is completed between the cloud application and the handshake component and the message is authenticated. If not, the message fails handshake authentication. At block 355, a determination is made as to whether the message is handshake authenticated. If the message is handshake authenticated, it is forwarded on, via the routing module, to one or more relevant on-premise applications at block 335. If the message fails handshake authentication, an error is thrown, at block 340, and recorded in the log file at block 345.

Figure 4:
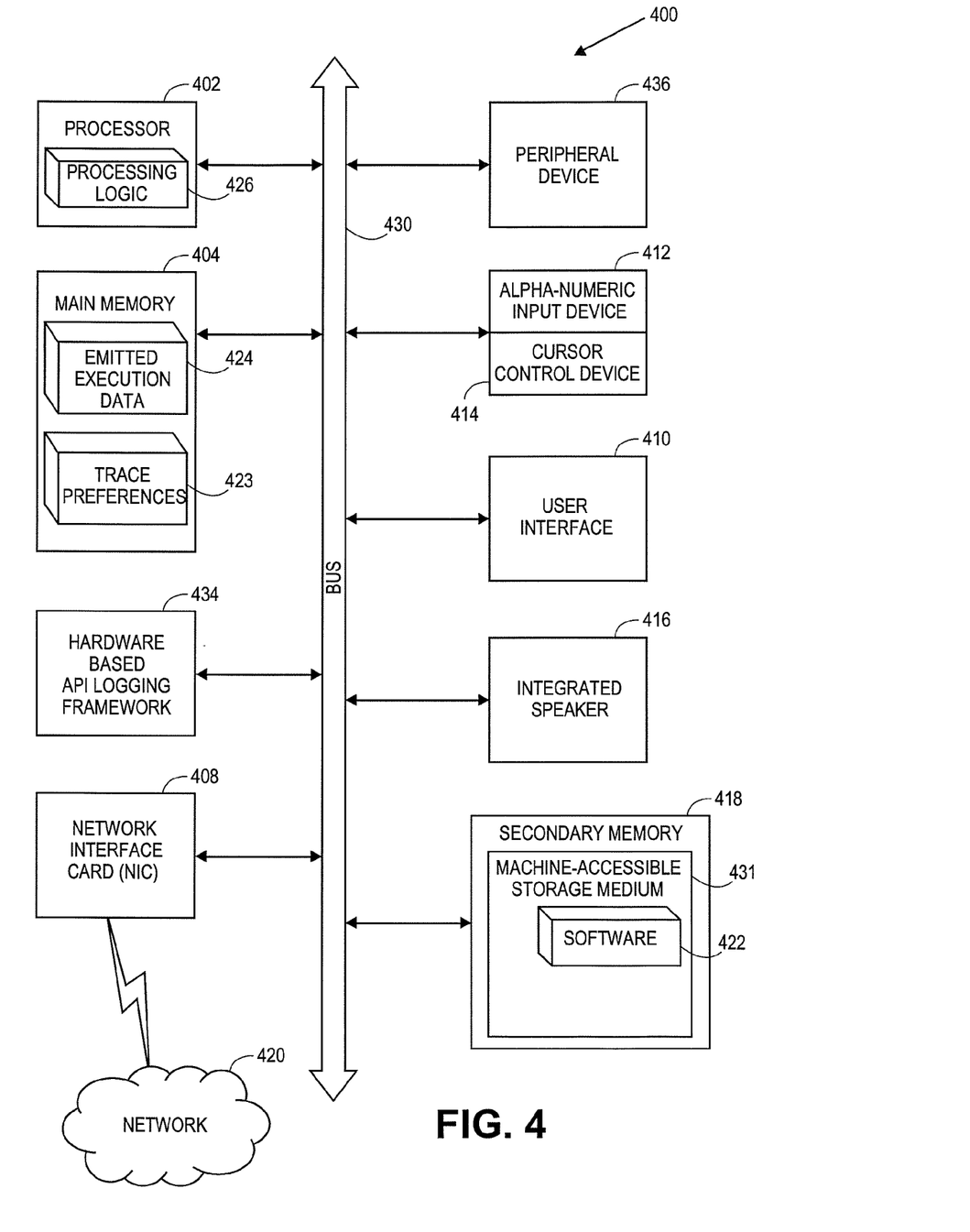
FIG. 4 illustrates a computer system according to one embodiment.

FIG. 4 illustrates a diagrammatic representation of a machine 400 in the exemplary form of a computer system, in accordance with one embodiment, within which a set of instructions, for causing the machine 400 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 418 (e.g., a persistent storage device including hard disk drives and persistent multi-tenant data base implementations), which communicate with each other via a bus 430. Main memory 404 includes emitted execution data 424 (e.g., data emitted by a logging framework) and one or more trace preferences 423 which operate in conjunction with processing logic 426 and processor 402 to perform the methodologies discussed herein.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and functionality of authentication mechanism 110 as described with reference to FIG. 1 and other figures discussed herein.

The computer system 400 may further include a network interface card 408. The computer system 400 also may include a user interface 410 (such as a video display unit, a liquid crystal display (LCD), or a cathode ray tube (CRT)), an alphanumeric input device 412 (e.g., a keyboard), a cursor control device 414 (e.g., a mouse), and a signal generation device 416 (e.g., an integrated speaker). The computer system 400 may further include peripheral device 436 (e.g., wireless or wired communication devices, memory devices, storage devices, audio processing devices, video processing devices, etc. The computer system 400 may further include a Hardware based API logging framework 434 capable of executing incoming requests for services and emitting execution data responsive to the fulfillment of such incoming requests.

The secondary memory 418 may include a non-transitory machine-readable storage medium (or more specifically a machine-accessible storage medium) 431 on which is stored one or more sets of instructions (e.g., software 422) embodying any one or more of the methodologies or functions of authentication mechanism 110 as described with reference to FIG. 1 and other figures described herein. The software 422 may also reside, completely or at least partially, within the main memory 404 and/or within the processor 402 during execution thereof by the computer system 400, the main memory 404 and the processor 402 also constituting machine-readable storage media. The software 422 may further be transmitted or received over a network 420 via the network interface card 408.

Figure 5:
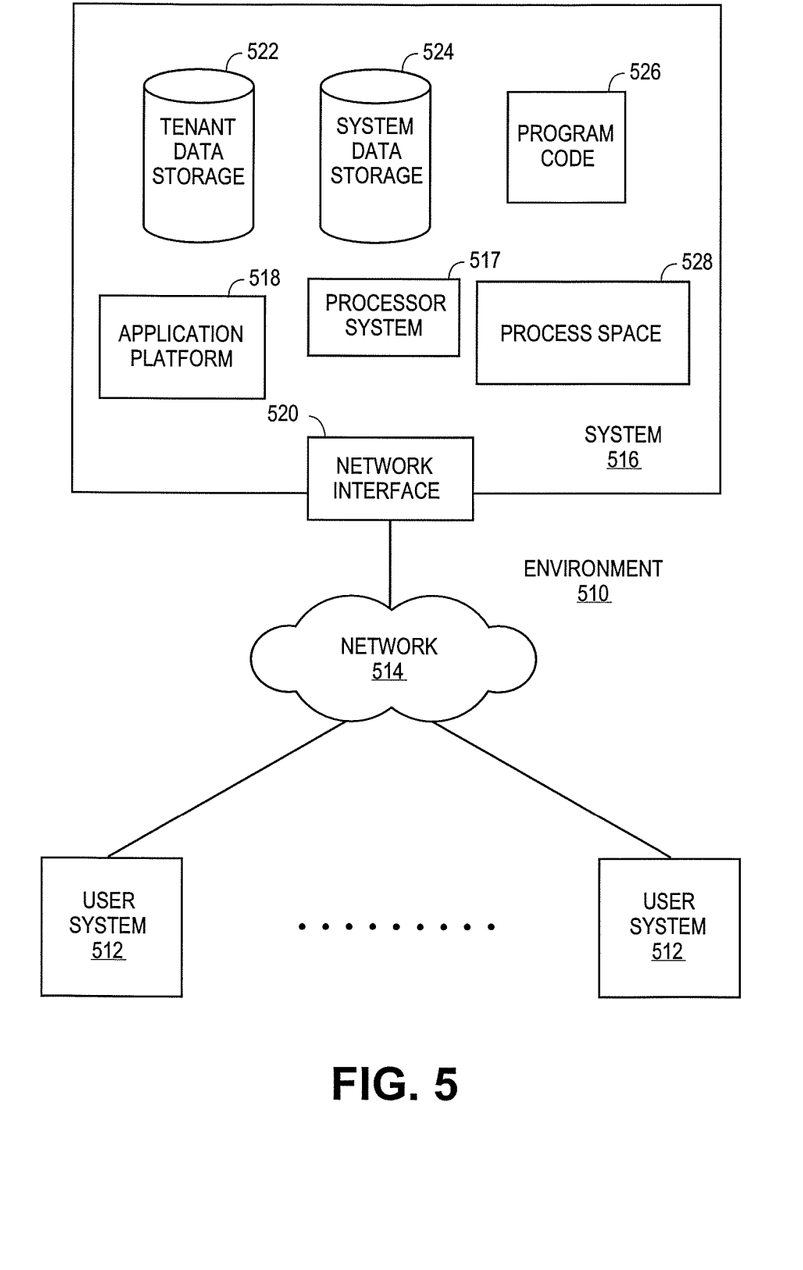
FIG. 5 illustrates a block diagram of an environment wherein an on-demand database service might be used according to one embodiment.

FIG. 5 illustrates a block diagram of an environment 510 wherein an on-demand database service might be used according to one embodiment. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
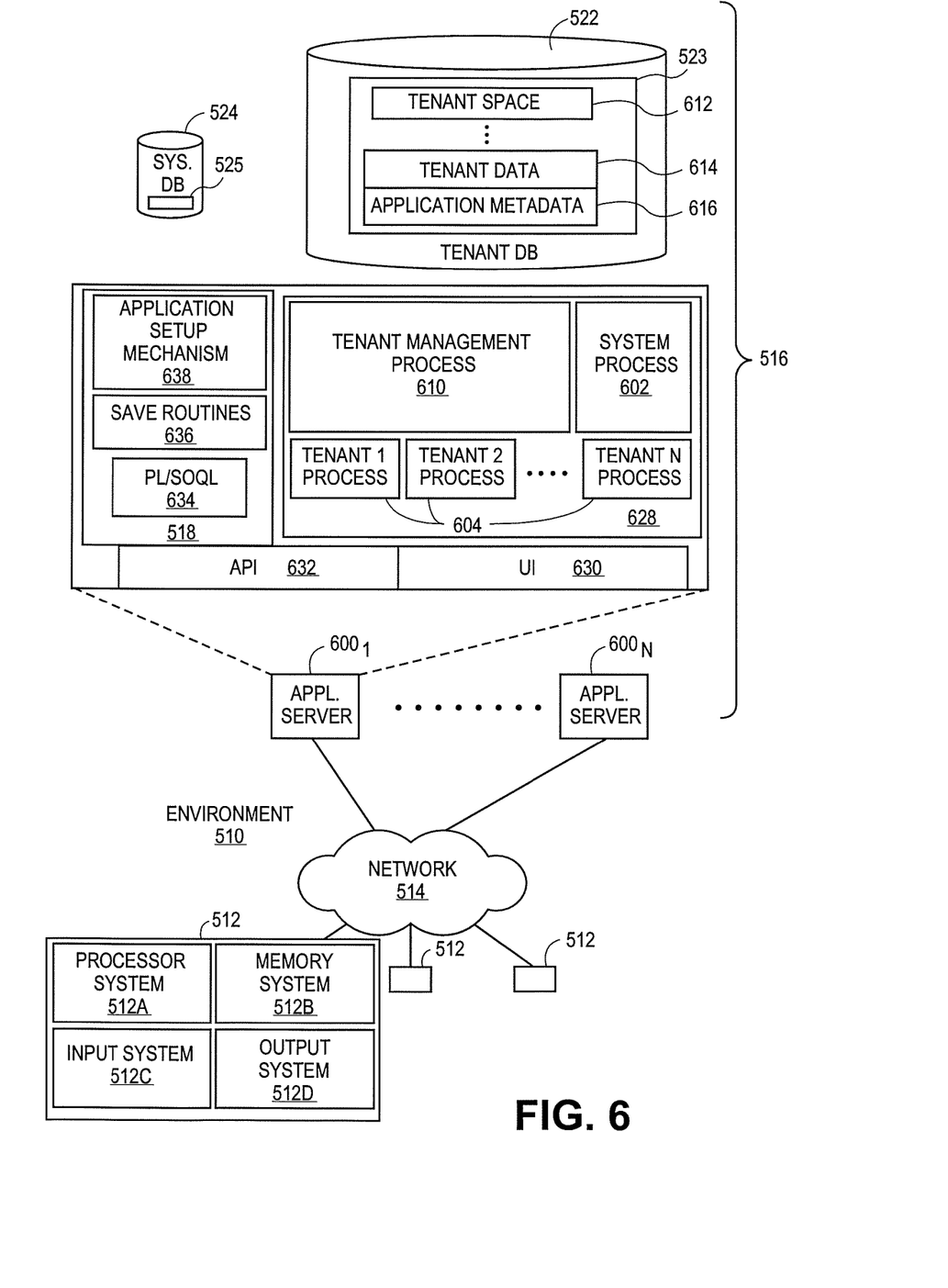
FIG. 6 illustrates a block diagram of an embodiment of elements of environment of FIG. 5 and various possible interconnections between these elements according to one embodiment.

FIG. 6 also illustrates environment 510. However, in FIG. 6 elements of system 516 and various interconnections in one embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600$_1$ might be coupled via the network 514 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that the one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:
1. A computer-implemented method comprising:
receiving, at an application server, a message relating to a server software application and on behalf of a client software application;

parsing, at the application server, contents of the message for verification purposes prior to routing the message to the client software application;
verifying, at the application server, the parsed contents of the message;
authenticating, at the application server, the message based on the verified contents of the message to determine granting or denying the routing of the message to the client software application, wherein authenticating includes
determining whether the parsed contents include identifying information,
performing an identifying information-based authentication if the parsed contents include the identifying information, and
performing a handshake-based authentication if the parsed contents do not include the identifying information, and
routing the first authenticated message to the client software application if the message is successfully authenticated and the routing is granted.

2. The computer-implemented method of claim 1, further comprising facilitating, at the application server, additional verification or additional authentication of the message if the message cannot be verified or fails authentication, respectively.

3. The computer-implemented method of claim 2, wherein facilitating additional verification comprises performing a handshake verification of the message if the message fails verification and a verification error message is issued and registered in a log file, wherein the handshake verification includes calling back the server software application for a direct verification by allowing the server software application to directly verify itself by issuing a return verification message.

4. The computer-implemented method of claim 2, wherein facilitating additional authentication comprises performing the handshake-based authentication of the message if the message fails authentication and an authentication error message is issued and registered in the log file, wherein the handshake authentication includes calling back the server software application for a direct authentication by allowing the server software application to directly authenticate itself by issuing a return authentication message.

5. The computer-implemented method of claim 1, wherein the parsed contents comprise confidential information, the confidential information having data components including one or more of a username, a password, a mark, a secret identifying term, a flag, and a confidential term, wherein the verification or authentication of the message fails if one or more of the data components is determined to be missing from the parsed contents.

6. The method of claim 1, wherein the client software application includes an on-premise software application residing at a client computing device, and wherein the server software application resides at a server computing device coupled to the application server, wherein the application server communicates with the client computing device over a network including a cloud network, wherein the server software, application comprises a cloud software application, wherein the cloud software application remains in communication with the on-premise software application over the network having security protocols comprising walls including an internal wall or an external wall.

7. A system comprising an application server having a memory to store instructions, and a processing device to execute the instructions, the application further having a mechanism to perform one or more operations comprising:

receiving a message relating to a server software application and on behalf of a client software application;
parsing contents of the message for verification purposes prior to routing the message to the client software application;
verifying the parsed contents of the message;
authenticating the message based on the verified contents of the message to determine granting or denying the routing of the message to the client software application, wherein authenticating includes
determining whether the parsed contents include identifying information,
performing an identifying information-based authentication if the parsed contents include the identifying information, and
performing a handshake-based authentication if the parsed contents do not include the identifying information; and
routing the first authenticated message to the client software application if the message is successfully authenticated and the routing is granted.

8. The system of claim 7, wherein the one or more operations further comprise facilitating, at the application server, additional verification or additional authentication of the message if the message cannot be verified or fails authentication, respectively.

9. The system of claim 8, wherein facilitating additional verification comprises performing a handshake verification of the message if the message fails verification and a verification error message is issued and registered in a log file, wherein the handshake verification includes calling back the server software application for a direct verification by allowing the server software application to directly verify itself by issuing a return verification message.

10. The system of claim 8, wherein facilitating additional authentication comprises performing the handshake-based authentication of the message if the message fails authentication and an authentication error message is issued and registered in the log file, wherein the handshake authentication includes calling back the server software application for a direct authentication by allowing the server software application to directly authenticate itself by issuing a return authentication message.

11. The system of claim 7, wherein the parsed contents comprise confidential information, the confidential information having data components including one or more of a username, a password, a mark, a secret identifying term, a flag, and a confidential term, wherein the verification or authentication of the message fails if one or more of the data components is determined to be missing from the parsed contents.

12. The system of claim 7, wherein the client software application includes an on-premise software application residing at a client computing device, and wherein the server software application resides at a server computing device coupled to the application server, wherein the application server communicates with the client computing device over a network including a cloud network, wherein the server software application comprises a cloud software application, wherein the cloud software application remains in communication with the on-premise software application over the network having security protocols comprising walls including an internal wall or an external wall.

13. A non-transitory machine-readable medium having stored thereon instructions which when executed by a machine, cause the machine to perform one or more operations comprising:

receiving, at an application server, a message relating to a server software application and on behalf of a client software application;

parsing, at the application server, contents of the message for verification purposes prior to routing the message to the client software application;

verifying, at the application server, the parsed contents of the message;

authenticating, at the application server, the message based on the verified contents of the message to determine granting or denying the routing of the message to the client software application, wherein authenticating includes determining whether the parsed contents include identifying information, performing an identifying information-based authentication if the parsed contents include the identifying information, and performing a handshake-based authentication if the parsed contents do not include the identifying information; and routing the first authenticated message to the client software application if the message is successfully authenticated and the routing is granted.

14. The non-transitory machine-readable medium of claim 13, wherein the one or more operations further comprise facilitating, at the application server, additional verification or additional authentication of the message if the message cannot be verified or fails authentication, respectively.

15. The non-transitory machine-readable medium of claim 14, wherein facilitating additional verification comprises performing a handshake verification of the message if the message fails verification and a verification error message is issued and registered in a log file, wherein the handshake verification includes calling back the server software application for a direct verification by allowing the server software application to directly verify itself by issuing a return verification message.

16. The non-transitory machine-readable medium of claim 14, wherein facilitating additional authentication comprises performing the handshake-based authentication of the message if the message fails authentication and an authentication error message is issued and registered in the log file, wherein the handshake authentication includes calling back the server software application for a direct authentication by allowing the server software application to directly authenticate itself by issuing a return authentication message.

17. The non-transitory machine-readable medium of claim 13, wherein the parsed contents comprise confidential information, the confidential information having data components including one or more of a username, a password, a mark, a secret identifying term, a flag, and a confidential term, wherein the verification or authentication of the message fails if one or more of the data components is determined to be missing from the parsed contents.

18. The non-transitory machine-readable medium of claim 13, wherein the client software application includes an on-premise software application residing at a client computing device, and wherein the server software application resides at a server computing device coupled to the application server, wherein the application server communicates with the client computing device over a network including a cloud network, wherein the server software application comprises a cloud software application, wherein the cloud software application remains in communication with the on-premise software application over the network having security protocols comprising walls including an internal wall or an external wall.

* * * * *